United States Patent
Gromes, Sr. et al.

(10) Patent No.: US 10,040,169 B2
(45) Date of Patent: Aug. 7, 2018

(54) SYSTEM AND METHOD FOR WIRELESS CONTROL USING A DEADMAN SWITCH

(71) Applicant: TERYDON, INC., Navarre, OH (US)

(72) Inventors: Terry D. Gromes, Sr., Navarre, OH (US); Terry D. Gromes, Jr., Navarre, OH (US); Jon M. Shockey, Jr., Canton, OH (US); William C. Jackson, Canton, OH (US)

(73) Assignee: Terydon, Inc., Navarre, OH (US)

( * ) Notice: Subject to any disclaimer, the term of this patent is extended or adjusted under 35 U.S.C. 154(b) by 194 days.

(21) Appl. No.: 14/204,350

(22) Filed: Mar. 11, 2014

(65) Prior Publication Data

US 2014/0336793 A1    Nov. 13, 2014

Related U.S. Application Data

(60) Provisional application No. 61/821,433, filed on May 9, 2013.

(51) Int. Cl.
*G05B 9/02* (2006.01)
*B24C 7/00* (2006.01)
(Continued)

(52) U.S. Cl.
CPC .............. *B24C 7/0015* (2013.01); *B26D 7/22* (2013.01); *B26F 3/004* (2013.01); *G05B 9/02* (2013.01);
(Continued)

(58) Field of Classification Search
CPC ......... G06F 3/01; G06F 3/04886; B26D 7/22; G05B 9/02; G05B 19/406; G05D 7/0676; G05D 7/0617; B26F 3/004; B24C 7/0015
(Continued)

(56) References Cited

U.S. PATENT DOCUMENTS

| 4,379,335 A | 4/1983 | Kirsch et al. |
| 4,380,796 A | 4/1983 | Ostby |

(Continued)

FOREIGN PATENT DOCUMENTS

| CN | 201828811 | * 5/2011 | ............. G05B 19/18 |
| DE | 3426889 | 5/1985 | |
| WO | 2009/131512 | 10/2009 | |

OTHER PUBLICATIONS

Topcon introduces X-22 wireless excavator control system, Online Article, Equipment World Staff, Oct. 28, 2011, http://www.equipmentworld.com/topcon-introduces-x-22-wireless-excavator-control-system/>, 4 pages.

(Continued)

*Primary Examiner* — Robert Cassity
(74) *Attorney, Agent, or Firm* — Sand & Sebolt (57) ABSTRACT

The present invention provides a system and method for wirelessly controlling an operating device by way of a wireless connection between the operating device and a computing device. The computing device provides an interface for controlling the operating device. The interface includes a switch for use as a deadman switch, whereby releasing the switch will cease the operation of the operating device. The user may remotely control the operating device via the computing device while the switch is actuated. Upon releasing the switch, the computer device wirelessly halts the operating device for safety.

18 Claims, 4 Drawing Sheets

(51) Int. Cl.
    *G06F 3/01*           (2006.01)
    *G05D 7/06*          (2006.01)
    *B26F 3/00*          (2006.01)
    *B26D 7/22*          (2006.01)
    *G05B 19/406*       (2006.01)
    *G06F 3/0488*      (2013.01)
    *B26D 5/00*          (2006.01)

(52) U.S. Cl.
    CPC .......... *G05B 19/406* (2013.01); *G05D 7/0617* (2013.01); *G05D 7/0676* (2013.01); *G06F 3/01* (2013.01); *G06F 3/04886* (2013.01); *B26D 5/00* (2013.01); *G05B 2219/39447* (2013.01); *G05B 2219/45036* (2013.01)

(58) Field of Classification Search
    USPC ............................................. 700/80, 83, 86
    See application file for complete search history.

(56) References Cited

U.S. PATENT DOCUMENTS

| | | |
|---|---|---|
| 4,760,859 A | 8/1988 | Brown |
| 5,954,494 A | 9/1999 | Goldsmith et al. |
| 6,681,839 B1 | 1/2004 | Balzer |
| 6,877,930 B2 | 4/2005 | Stromdahl et al. |
| 7,228,125 B2 | 6/2007 | Adachi et al. |
| 8,057,607 B2 | 11/2011 | Gardner et al. |
| 8,078,297 B2 | 12/2011 | Lasher et al. |
| 8,195,344 B2 | 6/2012 | Song et al. |
| 8,612,641 B1 | 12/2013 | Bozarth et al. |
| 8,676,390 B2 | 3/2014 | Berry, Jr. et al. |
| 8,978,276 B2 | 3/2015 | Moon, Jr. et al. |
| 9,363,220 B2 * | 6/2016 | Ubillos .................. H04L 51/24 |
| 2003/0065424 A1 | 4/2003 | Erichsen et al. |
| 2003/0147727 A1 | 8/2003 | Fujishima et al. |
| 2003/0202091 A1 * | 10/2003 | Garcia ................. B23D 59/002 |
| | | 348/86 |
| 2004/0093850 A1 | 5/2004 | Horii et al. |
| 2004/0182842 A1 * | 9/2004 | Denney ................ B23K 26/032 |
| | | 219/121.84 |
| 2005/0196314 A1 | 9/2005 | Petersen et al. |
| 2006/0090622 A1 | 5/2006 | Adkins |
| 2006/0212203 A1 | 9/2006 | Furuno |
| 2008/0062140 A1 | 3/2008 | Hotelling |
| 2008/0175569 A1 | 7/2008 | Johnson |
| 2008/0204426 A1 * | 8/2008 | Hotelling .............. G06F 3/0418 |
| | | 345/173 |
| 2008/0282583 A1 | 11/2008 | Koellner et al. |
| 2010/0095559 A1 | 4/2010 | Buckner |
| 2010/0185364 A1 | 7/2010 | McClure |
| 2010/0186971 A1 | 7/2010 | Seyffert |
| 2010/0313451 A1 | 12/2010 | Trubiano |
| 2011/0186657 A1 | 8/2011 | Haviland |
| 2011/0287692 A1 * | 11/2011 | Erichsen ................. B24C 1/045 |
| | | 451/5 |
| 2011/0301755 A1 | 12/2011 | Anderson |
| 2011/0315164 A1 | 12/2011 | DesOrmeaux |
| 2012/0007885 A1 * | 1/2012 | Huston ................... H04W 4/02 |
| | | 345/633 |
| 2012/0061108 A1 | 3/2012 | Cerrano |
| 2012/0229662 A1 | 9/2012 | Lankalapalli et al. |
| 2012/0330449 A1 | 12/2012 | Edwards et al. |
| 2013/0030589 A1 | 1/2013 | Pessina et al. |
| 2013/0033090 A1 | 2/2013 | Jokonya |
| 2013/0167697 A1 | 7/2013 | Reukers |
| 2013/0271004 A1 | 10/2013 | Min et al. |
| 2014/0045409 A1 | 2/2014 | Zhang et al. |
| 2014/0046477 A1 | 2/2014 | Brahan et al. |
| 2015/0065114 A1 | 3/2015 | Dua |
| 2015/0379785 A1 * | 12/2015 | Brown, Jr. ........... A01B 79/005 |
| | | 701/29.1 |

OTHER PUBLICATIONS

WardJet Brochure, X-Classic Controller, 2012, 3 pages.

* cited by examiner

SYSTEM AND METHOD FOR WIRELESS CONTROL USING A DEADMAN SWITCH

CROSS-REFERENCE TO RELATED APPLICATION

This application claims priority from U.S. Provisional Application Ser. No. 61/821,433, filed May 9, 2013, the disclosure of which is incorporated herein by reference.

BACKGROUND OF THE INVENTION

Technical Field

The present invention relates to control of devices. More particularly, the present invention relates to providing wireless control capabilities to an operating device, such as a water jet cutting machine. Specifically, the present invention relates to providing wireless control of an operating device, incorporating a deadman switch into the wireless control element.

Background Information

Often operating devices commonly used in industry are both manually controlled by a user as well as dangerous to the user. A water jet cutting machine is an example of such an operating device. Water jet cutting is an extremely dangerous activity, as the pressurized stream of water can cut through materials as hard as metal. It follows that any part of a human would easily be cut by this stream of water. Therefore, a user must always keep proper control of the cutting machine and ensure that the user's extremities are out of harm's way. However, water jet cutting machines are controlled via hydraulic or pneumatic tubes running from a control station which the user actuates to control the water jet cutting machine. This control station is typically a desk-like structure with four extending legs and is generally not practically movable. Therefore, the user is in a fixed position which may force the user to take unnecessary risks to remain in the fixed position while the water jet cutting machine passes close thereby. Further, the immovable nature of the control station may severely limit the user's ability to view the actual operations of the cutting machine. Still further, current water jet cutting machines do not account for whether the user is actually in control of the machine. The machine simply keeps cutting and performing its operations whether or not the user is positioned at the controls.

Thus, there is a tremendous need in the art to provide a mechanism for the user or controller of an operating device such as a water jet cutting machine to remain in control of the machine while still remaining mobile and not fixed to a particular position. Further, there is an additional tremendous need in the art to provide a system or method for ensuring the user is in control of the operating device, and has not become incapacitated, disabled, or simply left the machine's controls. There is a need in the art for an easy to assemble solution, possibly by way of a downloadable application installed on a computing device and connected logically to portions of the computing device's hardware,

SUMMARY

In one aspect, the invention may provide a method comprising the steps of: providing a computing device with wireless control of an operation of an operating device; determining whether a user is in control of the computing device; allowing the operation to begin running if the user is in control of the computing device and the user actuates the computing device to begin running the operation; repeatedly determining whether the user is in control of the computing device while the operation is running; and halting the operation when the user is not in control of the computing device.

In another aspect, the invention may provide an apparatus adapted to actuate an operation of a remote operating device, the apparatus comprising: a portable computing device, wherein the portable computing device includes a processor, a memory, and a wireless module, wherein the wireless module is adapted to wirelessly connect the portable computing device to the operating device; an element adapted to be actuated by a user of the portable computing device; a plurality of circuits, wherein the plurality of circuits interconnects the element, the processor, the memory; a switch variable stored in the memory, wherein the switch variable is settable to one of a first state and a second state, wherein the operation is enabled when the switch variable is in the first state, and wherein the operation is disabled when the switch variable is in the second state; wherein the switch variable is set to the first state when the user actuates the element; and wherein the switch variable is set to the second state when the user does not actuate the element.

In another aspect, the invention may provide a system for enabling and disabling an operation of a remote operating device, the system comprising: a portable computing device, wherein the portable computing device includes a wireless module and an element; a software application executable by the portable computing device, wherein the software application is adapted to enable and disable the operation; wherein the application disables the operation by default; wherein the application enables the operation when the element is manually pressed by a user; wherein the application activates the operation via the wireless module when the operation is enabled and the user actuates the portable computing device to activate the operation; and wherein the application deactivates the operation via the wireless module when the user manually releases the element.

BRIEF DESCRIPTION OF THE SEVERAL VIEWS OF THE DRAWINGS

A sample embodiment of the invention, illustrative of the best mode in which Applicant contemplates applying the principles, is set forth in the following description, is shown in the drawings and is particularly and distinctly pointed out and set forth in the appended claims.

Similar numbers refer to similar parts throughout the drawings.

DETAILED DESCRIPTION

Figure 1:
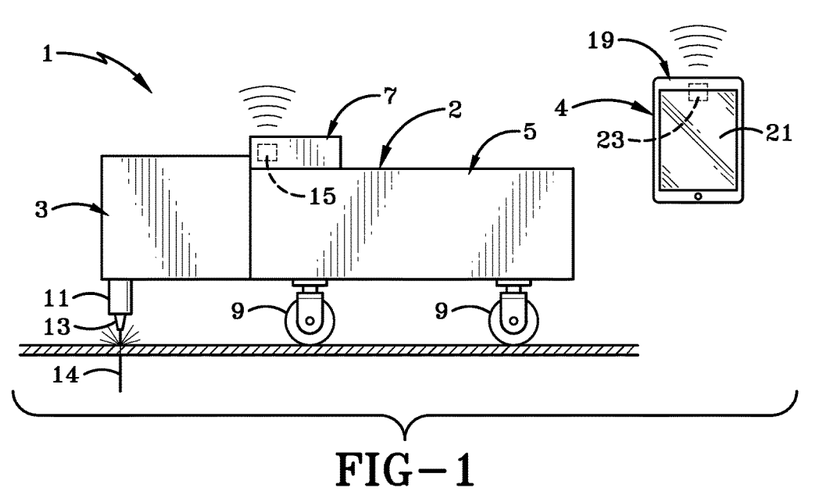
FIG. 1 is a view of a first embodiment of the present invention, including an operating device in the form of a water jet cutting machine and a computing device in the form of a remote control.

As shown in FIG. 1, the present invention pertains to a system and method for wireless control, a first embodiment thereof hereinafter referred to as system 1. System 1 is adapted to provide control of an operating device having at least one operation, which may be embodied in a device such as a water jet cutting machine, hereinafter referred to as water jet cutting machine 2. System 1 provides control by way of a computing device, hereinafter referred to as a remote control 4.

Water jet cutting machine 2 may be of any type of water jet device. For the present example, water jet cutting machine 2 is generally divided into a working unit 3 and a pump unit 5 interconnected by various components necessary and commonly used in the field of water jet technology, for example, a line for high pressure water, electrical power, and related mechanical elements and circuitry. Water jet cutting machine 2 further includes a control system or control unit 7 for controlling all of the various features of water jet cutting machine 2, including movement of water jet cutting machine 2 itself as well as control of the internal mechanisms relating to the stream of high pressure water. Control unit 7 may be integrated with water jet cutting machine 2 or may be separately connected thereto by way of connectors, as discussed in greater detail below.

Pump unit 5 includes all of the various features and mechanisms for moving water jet cutting machine 2 within the desired environment, including movement such as forward, reverse, left, right, stop, jog, etc. Pump unit 5 further includes all of the various features and mechanisms for pumping high pressure water from a water reservoir (not shown) or hose (not shown) to working unit 3 for use thereby. Pump unit 5 may further include a plurality of wheels 9 for use in moving water jet cutting machine 2 within the desired environment. It will be readily understood that pump unit 5 includes the various mechanical and electrical components necessary for moving water jet cutting machine 2 and supplying pumped high pressure water from pump unit 5 to working unit 3.

Working unit 3 includes various components necessary for applying a high pressure stream of water to the desired environment. As such, working unit 3 may include a nozzle holder 11 connected to a nozzle 13 for use in expelling a pressurized stream of water 14. Nozzle holder 11 and nozzle 13 are necessarily interconnected to the high pressure pumped water received from pump unit 5 as well as various motors or hydraulic mechanisms for moving nozzle 13 in the desired direction to expel high pressure stream of water 14 at a proper angle and flow rate in the desired environment.

Control unit 7 is interconnected with a wireless module 15. This connection may be done by a user manually coupling wireless module 15 to control unit 7 in an aftermarket hardware upgrade, or wireless module 15 may be integrated with control unit 7 by the manufacturer. Wireless module 15 includes all of the various circuitry and components necessary for transmitting and receiving electromagnetic radiation, particularly electromagnetic radiation in the radio frequency spectrum, namely 3 kHz to 300 GHz. Henceforth, this electromagnetic radiation will be referred to as "signals". Wireless signals received by wireless module 15 are used by control unit 7 to actuate the various components of water jet cutting machine 2. As such, wireless signals may actuate any of the various features or operations included in working unit 3 or pump unit 5. These features or operations include moving water jet cutting machine 2 in any direction or starting and stopping movement. The signals may also actuate any of the features or operations associated with nozzle 13 such as starting or stopping the flow of water, narrowing or widening the flow of water, or raising or lowering nozzle 13. The signals may also initiate an emergency stop procedure wherein all of the components of water jet cutting machine 2 immediately stop or shut down, including ceasing pressurized stream of water 14. This emergency stop may dump or cease pressure at working unit 3 or pump unit 5, or may dump or cease pressure at both working unit 3 and pump unit 5 to ensure safety and an immediate halt to the dangerous activity.

Control unit 7 may provide feedback relating to water jet cutting machine 2 to remote control 4 by way of wireless module 15. Control unit 7 may gather and update internal metrics and system information and provide this information to remote control 4 by way of wireless signals transmitted by wireless module 15. Wireless module 15 may transmit information such as current pounds per square inch ("PSI") of pressurized stream of water 14, gallons per minute ("GPM") of pressurized stream of water 14, orifice size of nozzle 13, current battery charge of an onboard battery system (not shown), or any other metrics or information available in water jet cutting machine 2. Control unit 7 may also include a memory (not shown) which stores or logs information relating to the operation of water jet cutting machine 2 for later transmission to remote control 4 or for later retrieval via an electronic wired connection directly to control unit 7 or for sending via email or any other data retrieval means.

Remote control 4 includes a housing 19 formed and sized to be portable and easily carried by an individual user. Remote control 4 further includes an interface 21 and wireless module 23 connected therebetween by circuitry and supported by a processor and all of the various electronic and mechanical devices necessary to support a portable computing device. Interface 21 is preferably embodied in a touchscreen interface. However, interface 21 may be any style of input/output system which may receive and provide graphical or tactile or any other informational responses via an engagement with the user. Wireless module 23 is similar to wireless module 15 in that wireless module 23 receives and transmits signals by way of electromagnetic radiation in the radio frequency spectrum. Wireless module 23 receives input from either the user via interface 21 or from wireless module 15 via signals. In the event that wireless module 23 receives input from the user via interface 21, wireless module 23 translates this input into signals readable by wireless module 15 and transmits these signals wirelessly thereto. Alternatively, in the event that wireless module 23 receives input from wireless module 15 via wireless signals, wireless module 23 translates this input into graphical or tactile representations and provides this input to the user via interface 21. Thus, it is a primary feature of the present invention to couple wireless module 23 with wireless module 15 to enable a user to hold remote control 4 and wirelessly actuate the various components and systems of water jet cutting machine 2, including any actuating any operations of machine 2.

Remote control 4 may be embodied by a common off-the-shelf component such as a tablet, phone, or any other common mobile computing device available to a common consumer. This mobile computing device receives a bundle of software or application which provides interface 21 to the user via the interface of the computing device. As such, the user or business may already own a device which can provide the hardware required for remote control 4 for water jet system 1. This represents and enormous cost savings to the user as a critical underlying piece of hardware for implementing system 1 may already be owned by the user.

Figure 2:
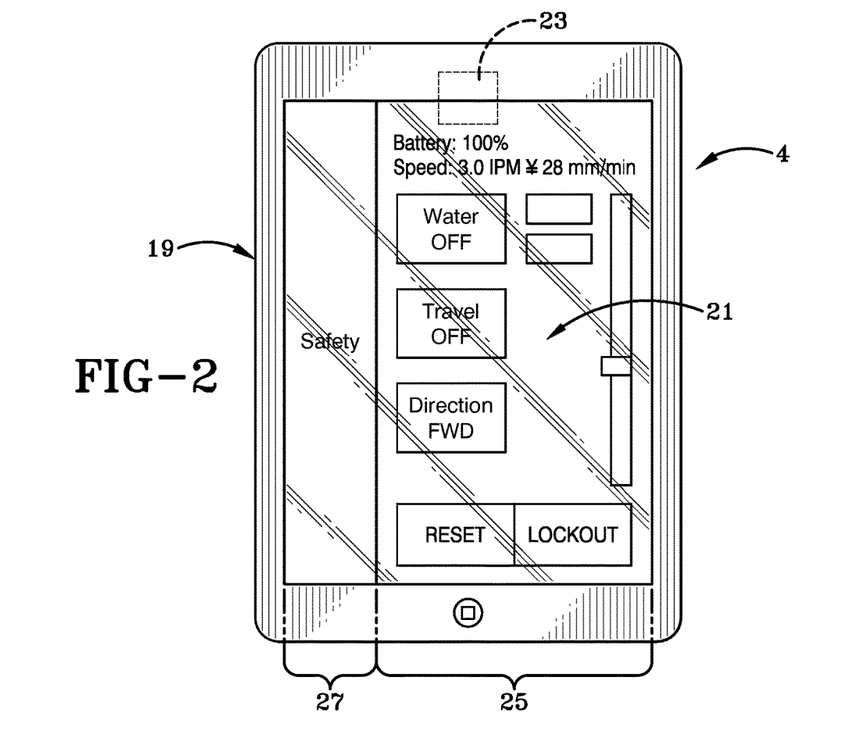
FIG. 2 is an enlarged view of an embodiment of the remote control of the present invention.

As shown in FIG. 2, interface 21 includes at least two zones for use in controlling and actuating the operations of water jet cutting machine 2. A control zone 25 is defined by interface 21 and used to display and input information relating to the control of water jet cutting machine 2. Control zone 25 may display the gathered metrics, feedback, or other information captured by control unit 7 and transmitted to remote control 4 by wireless module 15. Control zone 25 may also display a graphical user interface for controlling the movement of water jet cutting machine 2, the water pressure, nozzle 13 orifice size, or any other feature or operation the user may wish to control.

As shown in FIG. 2, a safety zone 27 is also defined by interface 21 and preferably located proximate control zone 25. Safety zone 27 is preferably touch sensitive and is connected via the circuitry and system logic of interface 21 to control unit 7 by way of wireless module 23 and wireless module 15. Safety zone 27 provides an elongated area along the side of interface 21 for receiving a finger of the user to ensure the user is in control of remote control 4 and manually holding remote control 4 by at least one hand. As such, safety zone 27 acts as a "dead man's switch" and is wired into the circuitry of interface 21 to immediately and automatically stop dangerous operations of water jet cutting machine 2 in the event the user holding remote control 4 manually releases a finger from safety zone 27.

Safety zone 27 and the ability to shut down system 1 in the event the user is no longer in control represents a critical safety feature of the present invention in that any time a user releases the touch connection between the user and safety zone 27, the dangerous operation of water jet cutting machine 2 ceases. A user may release remote control 4 due to incapacitation, disability, simple neglect, or even due to recklessness. In the preferred embodiment of the invention, all operations of water jet cutting machine 2 immediately stop when interface 21 senses a release of a finger from safety zone 27. However, inasmuch as the most critical and dangerous component of water jet cutting machine 2 is pressurized stream of water 14, at the minimum, water jet system 1 preferably ceases the operation of expelling pressured stream of water 14 when safety zone 27 is released by the user.

The present invention may include the feature that the emergency "STOP" instruction generated by the release of the user's finger from safety zone 27 is given top software level and machine level priority in water jet system 1. In the underlying machine language, various interrupts and message priorities may be given to the instruction which informs control unit 7 to cease operations of water jet cutting machine 2. This provides almost instantaneous and real-time control of water jet cutting machine 2 and ensures that the overall deactivation of water jet 2 is given top priority at the software and machine level.

Inasmuch as the user must be pressing at least one finger against safety zone 27, interface 21 continuously polls safety zone 27 for a touch input. When interface 21 receives an affirmative response that the user is touching safety zone 27, interface 21 continues normal operations and receives/transmits signals via wireless module 23 and interface 21 as needed. Control zone 25 receives input from the user and operates water jet cutting machine 2 as discussed above. However, the wireless nature of remote control 4 allows the user to adjust his physical whereabouts to best view and operate water jet cutting machine 2 as long as safety zone 27 is receiving a touch from the user. As such, water jet system 1 provides additional safety benefits in that a user is not "tied" to water jet cutting machine 2 by hoses or wires. The user may move and adjust physical position accordingly to remain safe and to more clearly observe the operations.

While the dead man's switch feature may be implemented by way of safety zone 27 on touchscreen interface 21, the present invention may encompass any way of providing a similar safety feature for stopping an operation when system 1 senses the user is no longer in control. For example, a button (not shown) may be provided which requires the user to push in or hold down the button to indicate the user is in control of system 1. Alternatively, a still camera or video camera (not shown) may be provided to acquire images of the user or holder of a portion of system 1 to indicate the user is in control of system 1. The camera may acquire an image and then determine if the image contains the user or is devoid of the user to determine if the user is in control of system 1. A light sensor may be provided whereby the user must keep a thumb or finger over the light sensor to indicate the user is in control of system 1. A gyroscopic sensor may be provided which senses movement in any of the X-axis, Y-axis, or Z-axis and uses this movement information to determine whether the user is in control of system 1. Thus, the concept of sensing whether a user is in control and thereafter enabling or disabling an operation is a feature of the present invention. This may be implemented with an element adapted to be actuated by a user, wherein the actuation enables the operation and the absence of actuation disables the operation. This may also be implemented with a switch variable in an application installed on remote control 4 and logically connected to an element, which determines which state the variable is set to. The switch variable may be set to a first state or a second state, whereby the first state indicates the application of remote control 4 should enable the operation, and whereby the second state indicates the operation should be disabled. The element logically connected to the variable may be one of the aforementioned graphics on a touchscreen, button, camera, light sensor, or gyroscopic sensor, which sets the switch variable based on whether the user is physically interacting with system 1 to indicate the user is in control of system 1.

Wireless module 15 and wireless module 23 are preferably wirelessly coupled via Bluetooth technology. The Bluetooth protocol includes a number of features which are advantageous to the present invention over alternative wireless communication systems. For example, Bluetooth requires very little power per transmission signal, typically in the 1 milliwatt range, so water jet cutting machine 2 and/or control unit 7 may incorporate a battery to provide overall power to water jet cutting machine 2. This greatly improves mobility of water jet cutting machine 2. This further increases safety, as an elongated hydraulic hose, pneumatic hose, or power line and the corresponding risk of accidental cutting of said hose or power line may be eliminated from water jet cutting machine 2. Bluetooth further provides an inherent security feature in that the low power of the signals limits the distance between water jet cutting machine 2 and remote control 4 to about ten meters. This limited range forces a user to actively remain in proximity to water jet cutting machine 2 while in use. One of the features of the present invention relates to the constant pinging back and forth between wireless module 15 and wireless module 23 to ensure the modules are in proximity. When a ping is unreturned, system 1 actuates a subroutine to shut down water jet cutting machine 2 to ensure safety. Further, Bluetooth technology does not require a line of sight between water jet cutting machine 2 and remote control 4 which is typically required in other wireless technologies such as infrared wireless communication. This allows a user to control water jet cutting machine 2 from a vehicle or behind a partition or safety shield. Finally, Bluetooth technology uses spread-spectrum frequency hopping to ensure that no other devices are transmitting on the same frequency at the same time. This provides a critical safety feature to ensure that no other devices can take control of or affect water jet cutting machine 2 and/or control unit 7.

Figure 3:
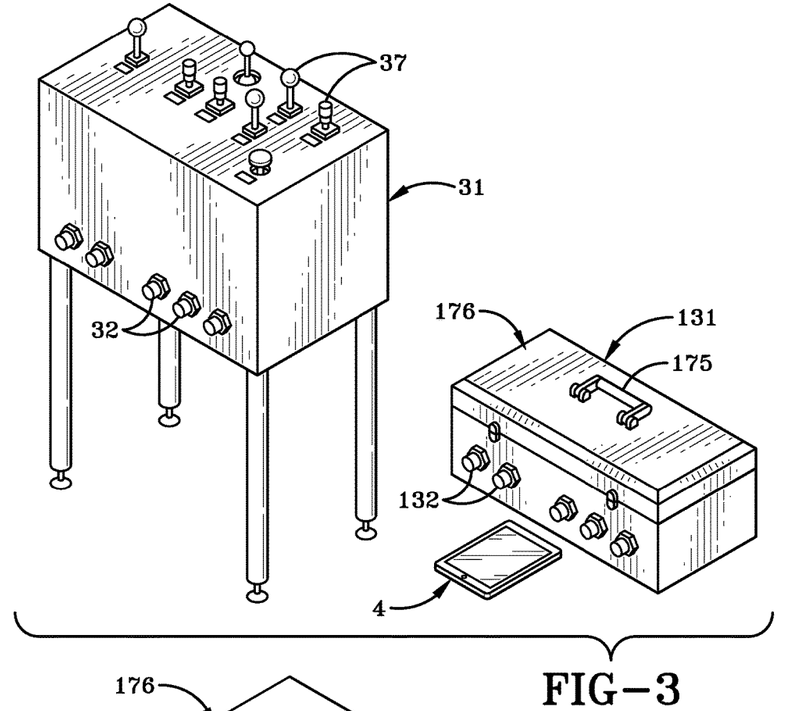
FIG. 3 is a view of a prior art water jet cutting system juxtaposed with a portion of a second embodiment of the present invention.
Figure 5:
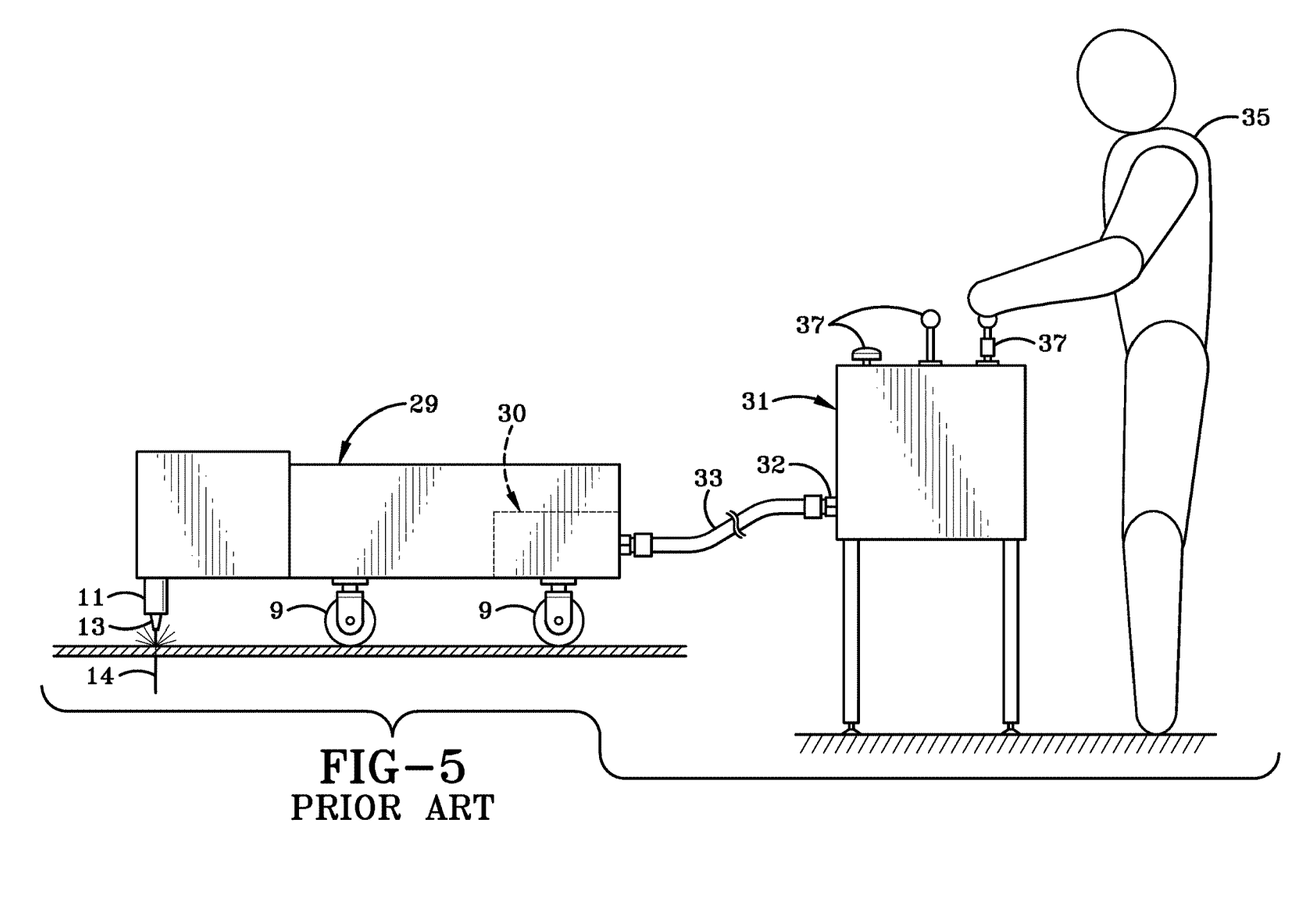
FIG. 5 is a perspective view of a prior art control station next to an operating device in the form of a water jet cutting machine.
Figure 6:
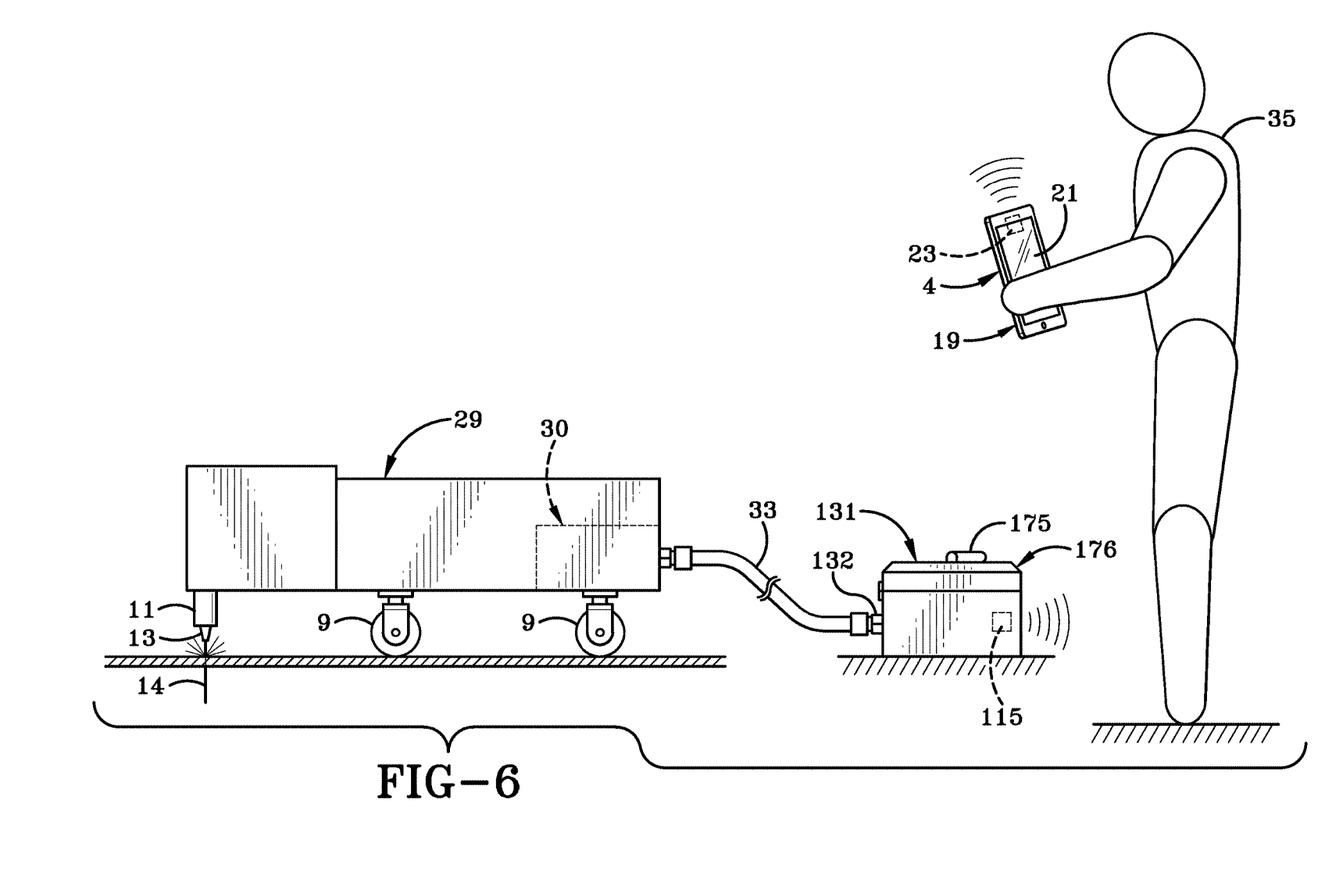
FIG. 6 is a perspective view of the second embodiment of the present invention next to an operating device in the form of a water jet cutting machine.

The wireless control of water jet cutting machine 2 by way of remote control 4 may be provided by way of a modularized system which is connectable to other operating devices such as water jet equipment and systems, as represented by a generic water jet equipment 29 shown in FIGS. 5 and 6. Generic equipment 29 is representative of any water jet device which may be movable along a track, movable without a track, a stationary device, any other style of operating device commonly found in any field. As shown in FIG. 3, one familiar with the water jet field will recognize that control unit 7 discussed above with respect to water jet cutting machine 2 improves elements commonly embodied in the prior art as an on board hardwired control system 30 and a control station 31. Onboard hardwired control system 30 is commonly connected via a group of hydraulic, pneumatic, and/or electric hoses/wires 33 (henceforth known as "lines 33") to a set of sockets or connectors 32 of control station 31. Control station 31 is actuated by a user 35 to send controlling pressure or electric signals via lines 33 to onboard control system 30, which in turn actuates equipment 29. User 35 manually manipulates a series of mechanical controls 37 to actuate equipment 29. As discussed above, this requires user 35 to stand in a fixed position to operate equipment 29. Further, control systems implementing control station 31 such as those shown in FIGS. 3 and 5 do not incorporate any mechanism to sense whether user 35 has become incapacitated or moved away from control station 31.

As shown in FIG. 3-6, a second embodiment of the present invention is shown as system 101, which includes a portable control unit 131 in communication with remote control 4. Portable control unit 131 includes a wireless module 115, similar to the previously discussed wireless module 15 of water jet system 1. Portable control unit 131 further includes a set of connectors 132, similar to connectors 32 of control station 31. In system 101, control unit 131 is connected to equipment 29 in place of control station 31. An operator or user such as user 35 operating system 101 manually locates control unit 131 in close proximity to equipment 29. User 35 then manually disconnects lines 33 from connectors 32 of control station 31 and reconnects those lines 33 to the appropriate connectors 132 of control unit 131. User 35 then initiates a Bluetooth pairing of control unit 131 with remote control 4 via wireless module 115 of control unit 131 and wireless module 23 of remote control 4. Once control unit 131 is paired and coupled with remote control 4, user 35 simply manipulates interface 21 while holding a finger on safety zone 27 to operate equipment 29. User 35 is free to move about to more easily see the operation of equipment 29 or to move to safer areas as equipment 29 performs its operations.

Figure 4:
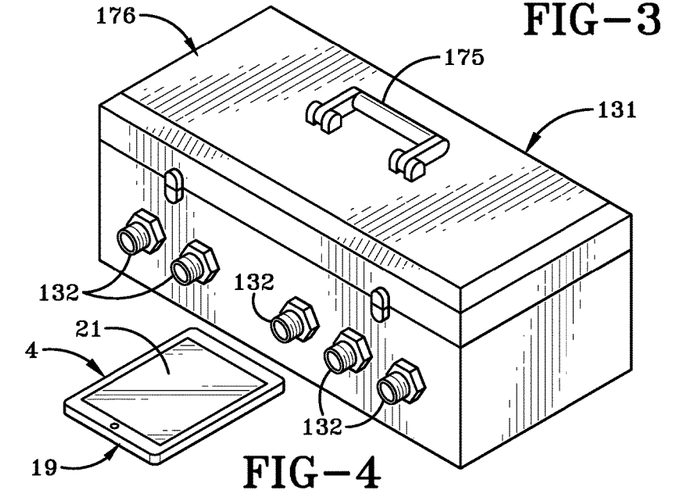
FIG. 4 is a view of a portion of the second embodiment of the present invention, including a computing device and a control unit.

Inasmuch as the water jet industry enjoys a generally standardized set of connectors for actuating various equipment or machines, control unit 131 can be connected to a number of different pieces of equipment to provide wireless control and a dead man's switch to any user of that equipment. Further, adapters may be provided to interconnect any necessary items or elements and to allow control unit 131 to connect with various equipment and operating devices. Further, control unit 131 is entirely portable and able to be easily transported between jobsites by a single individual with no specialized equipment. This represents an advantage over the prior art which provided large bulky control units such as those indicated as control station 31 in FIGS. 3 and 5. As shown in FIG. 3, one will readily note the size and weight differences between control station 31 and control unit 131. The small size and portability of control unit 131 allows a user to transport wireless control system 101 between physical locations. Further, efficiencies are realized by using one control unit 131 in place of several control stations 31. As shown in FIG. 4, control unit 131 may be provided with a handle 175 extending from a housing 176 used to encapsulate the internal mechanisms of control unit 131. Control unit 131 is further provided with an electrical input such as a power receiving prong or set of prongs (not shown) for receiving a power cord from an electrical source. Further, control unit 131 may be provided with a battery backup system (not shown) for providing batter power to control unit 131 in the event of a power outage or simply to provide better portability to control unit 131.

Control unit 131 is provided with various mechanical components for actuating the various connectors 132 as instructed by the holder of remote control 4. A set of solenoids (not shown) may be used to turn a particular connector on or off. The set of solenoids may be electronically actuated, hydraulically actuated, or pneumatically actuated. Further, it has been discovered that the bleed off pilot pressure from a particular electronically actuated solenoid may be connected with a manual hydraulic or manual pneumatic actuation control to allow a user to manually actuate the electronic solenoid in the event of a power failure. This manual actuation may then be actuated by a user to stop a process when the electric power to the solenoid is not operating and provides a critical safety mechanism for control unit 131. While solenoids may be used for on/off control of connectors 132, a similar set of servomotors (not shown) may be used in conjunction with the set of solenoids to control the rate of flow through the connectors.

Control unit 131 may include one or more sensors for ensuring overall safety in system 1. Control unit 131 may include a gyroscopic sensor (not shown) which actuates system 1 to initiate a subroutine to shut down equipment 29 when it senses any kind of quick movement of control unit 131. The movement may be caused by an accident on the job site, an earthquake, an explosion, a vehicle bumping or disrupting control unit 131 or any other reason for unintentionally imparting quick movement to control unit 131. This safety feature allows for an automatic deadman switch type of shut down of equipment 29. Other sensors may also be employed for similar safety and automatic shutdown of equipment 29. For example, a pressure sensor may be employed for use in shutting down equipment 29 in the event of a drop or rise in pressure beyond a predetermined threshold. Likewise, a gas sensor for detecting flammable gases may be employed in a similar manner. Further, a battery sensor or subroutine may be employed to track the battery life of remote control 4 and to ensure equipment 29 is automatically shutdown before remote control 4 loses power.

While equipment in the field all includes a generally standardized set of connectors, the actual pressures, voltages, hydraulics, etc. used to interact with the equipment needs tailored or customized for each model of equipment, each equipment family, or each operating device. This is addressed by offering plugins, software updates, or even entirely different encapsulated applications for each model of equipment or equipment family which a user may desire to control. As such, interface 21 may be offered in whole or in part as a physical bundle of software, a software download from the Internet, or as a precompiled application downloadable through an application store such as iTunes® or Google Apps Marketplace®, or downloadable through the Internet in general. One will readily understand that this software may be offered for each desired underlying operating system or hardware architecture to allow a user to use an off-the-shelf tablet or mobile device as remote control 4.

For example, if a user purchases or rents a particular piece of equipment 29A and desires to utilize system 101 with equipment 29A, the user downloads and installs software which is tailored to provide an interface 21A on the user's mobile device. This enables that device to become remote control 4 and control equipment 29A. If the user has an iPad®, the software download will be compiled and customized to run on an iPad®. If that user wishes to use a new piece of equipment 29B, system 101 may include the feature that the user may update the software to provide an interface 29B to control equipment 29B. System 101 may alternatively include the feature that the user may download a new piece of software which is tailored to provide interface 29B on the user's mobile device. Or the software may be configured such that a user must purchase a new activation code to use interface 21 with a new piece of equipment.

Similar to updating or changing the underlying software, the hardware may be updated or changed as well in system 101. If the user acquires a Kindle Fire® and wishes to now control equipment 29B on the Kindle Fire® the software to provide interface 29B may be downloaded and installed on the Kindle Fire®. As such, any method for providing to the user a way to incorporate an off-the-shelf mobile device with interface 21 is contemplated by the present invention. The underlying software to provide interface 21 may be a single download, a plugin to previously installed software, or any other method common in the art for providing and updating software.

The application used with remote control 4 to control the operating device may be configured or programmed to utilize one or more particular hardware features of the computing device, such as a touchscreen, button, camera, light sensor, or gyroscopic sensor. These pieces of computing hardware may be logically connected to internal variables residing in the application and may be configured to control the enabling and disabling of an operation on the operating device.

Interface 21 and the software involved with providing interface 21 may keep a detailed record of events and status information produced while interface 21 is used. Further, system 101 may provide a data collection subroutine running in the background to export all data or any relevant data to a file or database for later analytics or review. System 101 may even store commonly used routines or manipulations of interface 21 for repeatability of common operations. Costing and timing information may be obtained and stored by the software. Interface 21 may be integrated with accounting or purchasing software, or automatically update a database such as an enterprise level inventory database, etc. Usage and depreciation of particular system components such as a blade or a nozzle may be automatically calculated and linked with a purchasing system. All of these features are contemplated and within the scope of system 101.

While the above system 101 is discussed with respect to the water jet cutting field, it will be readily apparent that control unit 131 may be reconfigured and customized to apply to any field of commercial or industrial activities. It follows that interface 21 may also be customized to apply to the alternative field of commercial or industrial activities. Thus, it is within the scope of the present invention that a wireless control system similar to those discussed above may be connected or coupled to any device where the user is required to be tethered to or in a fixed position for operating the device or where a deadman switch would be beneficial.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the invention are an example and the invention is not limited to the exact details shown or described.

The invention claimed is:

1. A method comprising the steps of:
   providing a water jet cutting or cleaning device for performing a cutting or cleaning operation;
   providing a hand-held computing device remote from the a water jet cutting or cleaning device;
   wirelessly linking the water jet cutting or cleaning device and the computing device together;
   controlling the cutting or cleaning operation of the water jet cutting or cleaning device using the computing device;
   providing an element on the computing device;
   determining whether a user is in control of the computing device by determining if there is continuous contact by the user with the element;
   allowing the cutting or cleaning operation to begin and continue running if the user keeps continuous contact with the element while simultaneously operating the computing device to control the water jet cutting or cleaning device
   repeatedly determining whether the user is maintaining continuous contact with the element while simultaneously operating the computing device while the cutting or cleaning operation is running; and
   halting the cutting or cleaning operation of the water jet cutting or cleaning device when the user breaks contact with the element of the computing device.

2. The method of claim 1, further comprising the steps of:
   determining the user is in control of the computing device when the user is continuously actuating the element; and
   determining the user is not in control of the computing device when the user is not actuating the element.

3. The method of claim 1, further comprising the steps of:
   providing the element as a touchscreen;
   determining the user is in control of the computing device when the user is in continuous contact with the element on the touchscreen; and
   determining the user is not in control of the computing device when the user is not touching the element on the touchscreen.

4. The method of claim 3, further comprising the steps of:
   partitioning the touchscreen on the computing device into a safety zone and a control zone; where the safety zone comprises the element of the computing device;

allowing the user to actuate the cutting or cleaning operation by touching the control zone;

determining the user is in control of the computing device when the user is constantly touching the safety zone; and determining the user is not in control of the computing device when the user is not touching the safety zone.

5. The method of claim 4, further comprising the step of positioning the safety zone to align with a thumb on a hand of the user when the user is holding the computing device in the hand.

6. The method of claim 2, further comprising the steps of:
providing the element as a button;
determining the user is in control of the computing device when the user is continuously pressing the button; and
determining the user is not in control of the computing device when the user is not pressing the button.

7. The method of claim 6, further comprising the step of positioning the button to align with a thumb on a hand of the user when the user is holding the computing device in the hand.

8. An apparatus adapted to actuate a cutting or cleaning operation of a remote water jet cutting or cleaning device, the apparatus comprising:
a portable computing device, wherein the portable computing device includes a processor, a memory, an element, and a wireless module, wherein the wireless module is adapted to wirelessly connect the portable computing device to a remote operating device; wherein the
the element is adapted to be actuated by direct continuous contact therewith by a user of the portable computing device;
a plurality of circuits, wherein the plurality of circuits interconnects the element, the processor, and the memory;
a switch variable stored in the memory, wherein the switch variable is settable to one of a first state and a second state, wherein the cutting or cleaning operation of the remote water jet cutting or cleaning device is enabled when the switch variable is in the first state, and wherein the cutting or cleaning operation is disabled when the switch variable is in the second state;
wherein the switch variable is set to the first state when the user actuates the element by contacting the element and maintaining continuous contact with the element on the computing device while simultaneously operating the computing device to control the water jet cutting or cleaning device; and
wherein the switch variable is set to the second state when the user breaks contact with the element.

9. The apparatus of claim 8, wherein the element is a touchscreen disposed on the computing device, and wherein the touchscreen is actuated by manual pressure.

10. The apparatus of claim 8, wherein the element is a button disposed on the computing device, and wherein the button is actuated by manual pressure.

11. A system for enabling and disabling a cutting or cleaning operation of a remote water jet cutting or cleaning device, the system comprising:
a portable computing device, wherein the portable computing device includes a wireless module and an element;
a software application executable by the portable computing device, wherein the software application is adapted to selectively enable the cutting or cleaning operation of a remote water jet cutting or cleaning device or to selectively disable the cutting or cleaning operation of the remote water jet cutting or cleaning device and to perform the cutting or cleaning operation when a user is in direct contact with the element on the computing device and wherein while maintaining direct contact with the element the user controls the water jet or cleaning device to perform the cutting or cleaning operation in real time;
wherein the software application disables the cutting or cleaning operation of the remote water jet cutting or cleaning device by default;
wherein the software application enables the cutting or cleaning operation of the remote water jet cutting or cleaning device only when the element on the computing device is continuously manually pressed by the user while the user simultaneously operates the computing device to control the water jet cutting or cleaning device;
wherein the software application activates the cutting or cleaning operation of the remote water jet cutting or cleaning device via the wireless module when the cutting or cleaning operation is enabled by the software application and the user actuates the portable computing device to activate the cutting or cleaning operation; and
wherein the application deactivates the cutting or cleaning operation of the remote water jet cutting or cleaning device via the wireless module when the user manually releases the element on the computing device.

12. The system of claim 11, wherein the element is a touchscreen.

13. The system of claim 12, further comprising:
a safety zone portrayed on the touchscreen by the application; and
a control zone portrayed on the touchscreen by the application.

14. The system of claim 11, wherein the element is a button.

15. The method of claim 1, wherein the step of providing the water jet cutting or cleaning device comprises providing a water jet cutting machine for performing a cutting operation using a jet of water under high pressure; and wherein the step of wirelessly linking comprises wirelessly linking the water jet cutting machine with the portable computing device.

16. The method of claim 15, wherein the step of providing an element on the computing device comprises providing a deadman switch on the computing device; and wherein the steps of controlling and operating of the water jet cutting machine, further comprises, maintaining physical contact with the deadman switch on the computing device.

17. The method of claim 16, wherein the step of maintaining physical contact further comprises keeping the user's finger or thumb in constant physical contact with the deadman switch.

18. The method of claim 16, wherein the step of halting the cutting or cleaning operation comprises halting the cutting or cleaning operation of the water jet cutting machine when the user's finger or thumb is lifted off the deadman switch on the computing device.

* * * * *